United States Patent

[11] 3,599,284

[72] Inventors Yuko Osa;
 Okitada Hara, both of Tokyo-to, Japan
[21] Appl. No. 817,086
[22] Filed Apr. 17, 1969
[45] Patented Aug. 17, 1971
[73] Assignee Ishikawajima-Harima Jukogyo Kabushiki Kaisha
 Yokyo-to, Japan
[32] Priority Apr. 19, 1968
[33] Japan
[31] 43/26298

[54] DEVICE FOR CONTINUOUSLY MOLDING HOLLOW ARTICLES FROM THERMOPLASTIC MATERIAL
 3 Claims, 13 Drawing Figs.
[52] U.S. Cl. .................................................. 18/5 BP, 18/20 B
[51] Int. Cl. .................................................. B29d 23/03
[50] Field of Search ................................. 18/5 B, 4 M, 4 P, 20 B, 30 PR, 30 PS, 30 I, 12 TP, 5 BP; 1/20 B

[56] References Cited
UNITED STATES PATENTS
3,332,112  7/1967  Park ............................. 18/5 BV X
3,355,763  12/1967  Willert ........................ 18/5 BP Primary Examiner—J. Spencer Overholser
Assistant Examiner—Norman E. Lehrer
Attorney—Nolte and Nolte ABSTRACT: A device that is composed of a number of split dies for molding hollow articles disposed equiangularly along the circumference of a circle, a rotary guide which rotatingly moves keeping a certain relation to said split dies and sends to said split dies by turns thermoplastic material pushed out in the form of a pipe, and a pipe die means that blows air or the like into the pipe of thermoplastic material and pushes out the pipe which rotates in accordance with the moving of said rotary guide.

PATENTED AUG 17 1971

INVENTORS
YUKO OSA
OKITADA HARA

BY *Nolte & Nolte*
ATTORNEYS

INVENTORS
YUKO OSA
OKITADA HARA

BY Nolte & Nolte
ATTORNEYS

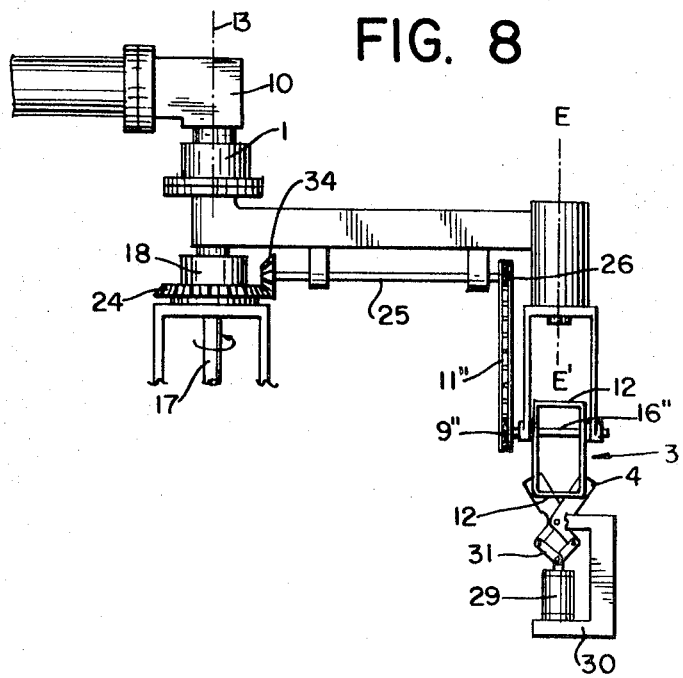
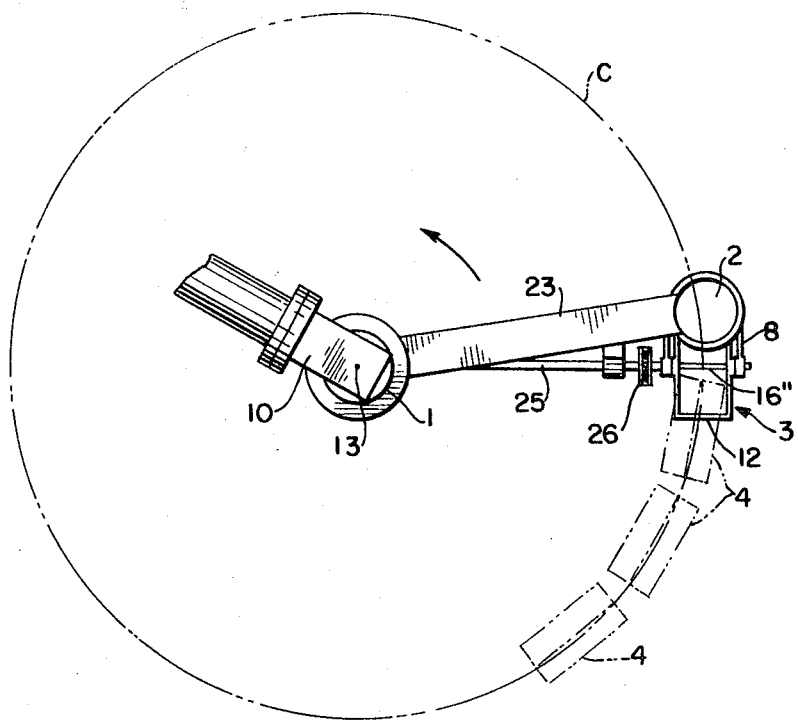
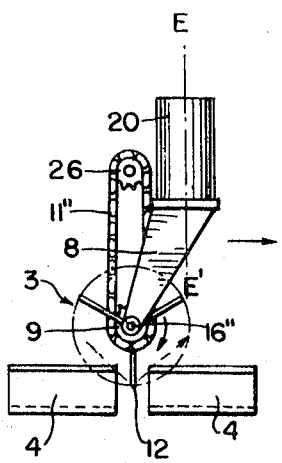

DEVICE FOR CONTINUOUSLY MOLDING HOLLOW ARTICLES FROM THERMOPLASTIC MATERIAL

DETAILED EXPLANATION OF THE INVENTION

Various devices for molding continuously hollow articles from thermoplastic material are known. In one device, a plurality of split dies for molding hollow articles are disposed in a vertical plane along the circumference of a circle; and these dies are rotated so as to directly clamp the thermoplastic material extrude in the form of tube. In another device of the type described, a plurality of split dies disposed in the form of caterpillar is rotated thereby continuously clamping the tubular thermoplastic material.

In the above and other devices of the type described, the split dies for molding hollow articles are advanced sequentially to the clamping position so that they have the following defects:

1. Construction is complicated because a die-clamping mechanism, air-blowing mechanism and so on must be disposed within a very limited space;
2. Because of the heavy weight of the rotary member, large vibrations and louder noise are generated;
3. Rotary members subject to friction are easily susceptible to abrasion and wear; and
4. In case of a large capacity type, the device is heavy in weight and requires a strong clamping force so that it has been so far impossible to provide large-sized rotary-type split dies in view of their mechanism.

In view of the above, the primary object of the present invention is to eliminate the above and other defects encountered in the conventional devices of the type described. This object of the present invention can be accomplished by a device for continuously molding hollow articles from thermoplastic material according to the present invention characterized in that a number of $N$ pairs of split dies which are adapted to open or close are disposed upon a plane in equiangularly spaced-apart relation along the circumference of a circle; a parison die member is disposed so as to rotate about the center of a die-carrying or supporting frame which carries or supports said split dies; blower means is provided in communication with a central hole formed through said parison die member; a rotary guide having a number of $n$ legs is rotatably disposed upon said parison die member or a rotary frame; and a rotary drive mechanism for said parison die member and said rotary guide is so arranged that each leg of said guide is caused to rotate relative to the split dies by maintaining the relation of: $\omega/\omega' = n/N$
where
$\omega$ = angular velocity of rotation of said parison die member of said rotary frame about the center of said die-carrying or supporting frame, and
$\omega'$ = angular velocity of each leg of said rotary guide relative to said parison die member of said rotary frame whereby the thermoplastic material extruded from said parison die member is supported by one of said legs of said rotary guide while being charged into one of said pairs of split dies.

The present invention will be described in more detail with reference to the accompanying drawings.

Figure 3A:
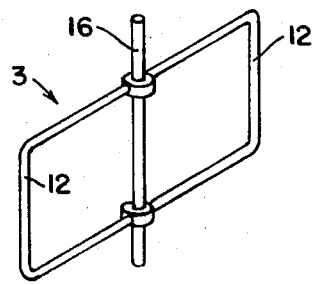
Figure 3B:
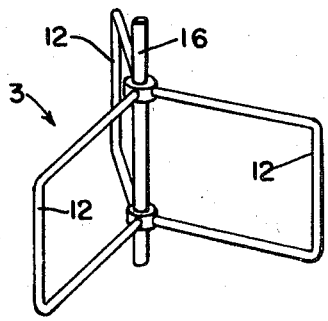
Figure 3C:
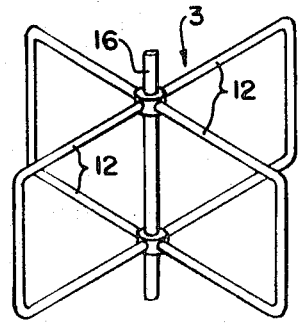
Figure 3D:
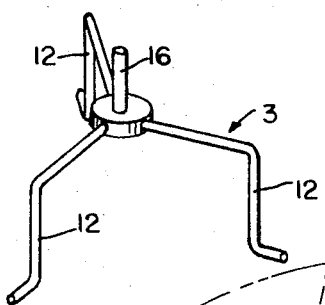
Figure 4:
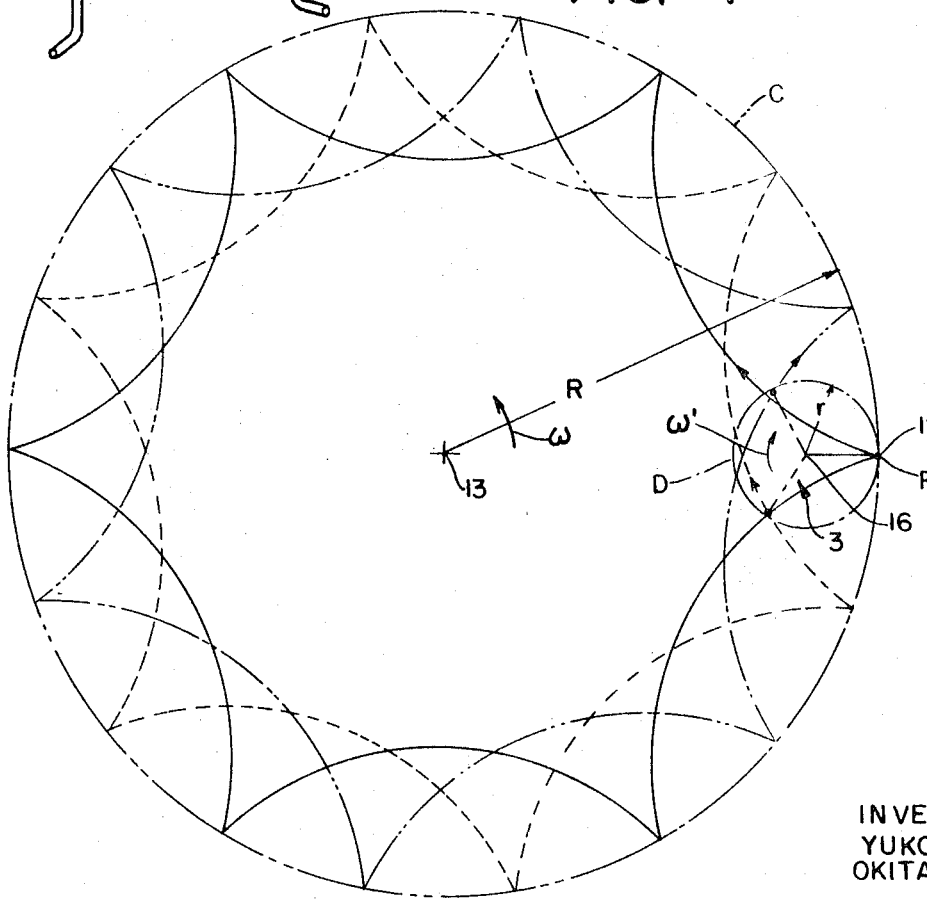
Figure 5:
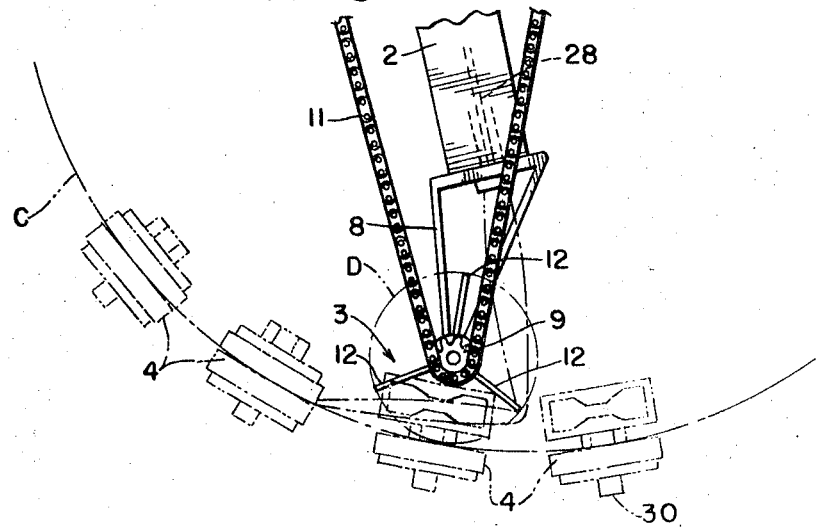
Figure 6:
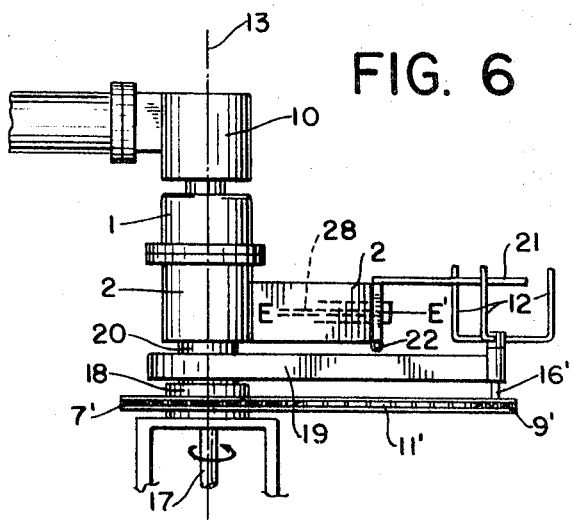
Figure 7:
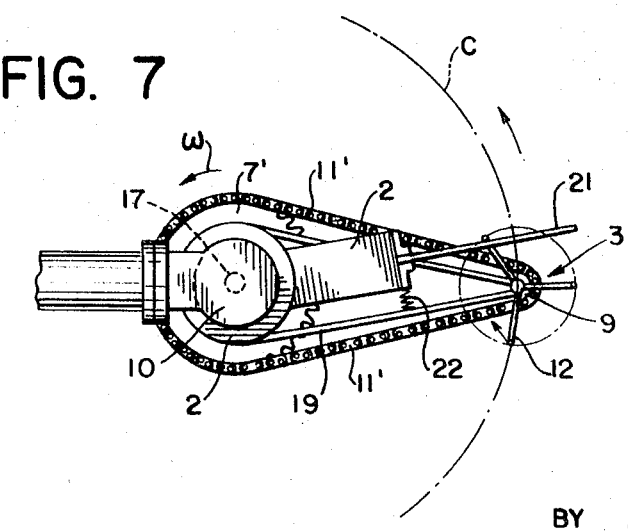

FIGS. 3a, b, c and d are explanatory views illustrating various embodiments of a rotary frame guide used in the present invention;

FIG. 4 is an explanatory view illustrating the curve traced by a point of one leg of the rotary guide in operation;

FIG. 5 is an explanatory view illustrating the synchronized actuation of the rotary guide and a pair of split dies for molding hollow articles;

FIGS. 6 and 7 are side and plan views of another embodiments of the present invention respectively; and FIGS. 8 to 10 are views for explanation of still another embodiment of the present invention in which thermoplastic material is extruded in the vertical direction and molded by split dies disposed horizontally.

Figure 1:
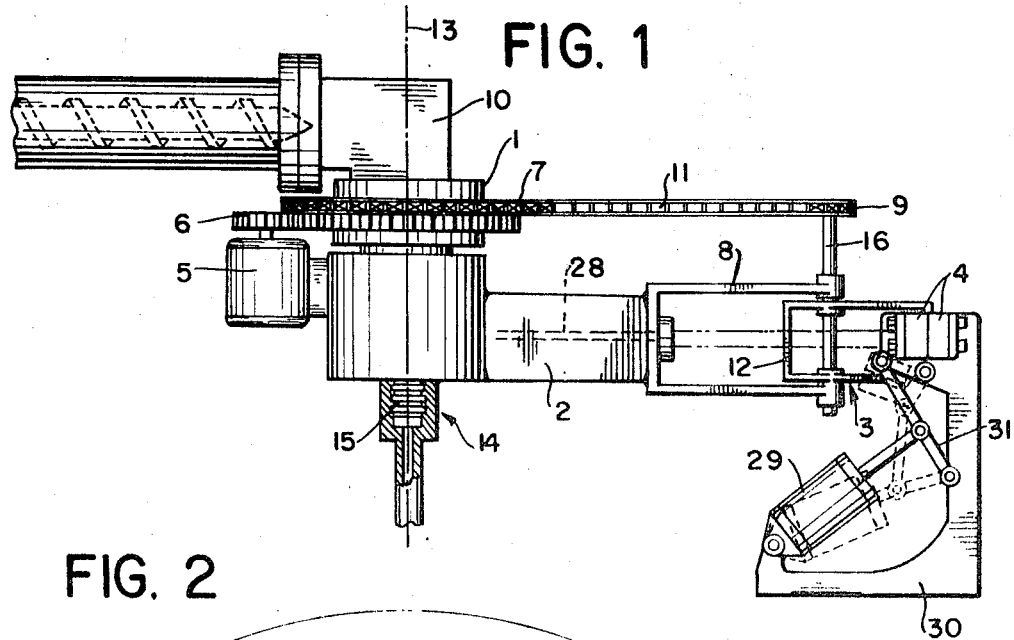
FIG. 1 is a side view of one preferred embodiment of the present invention.
Figure 2:
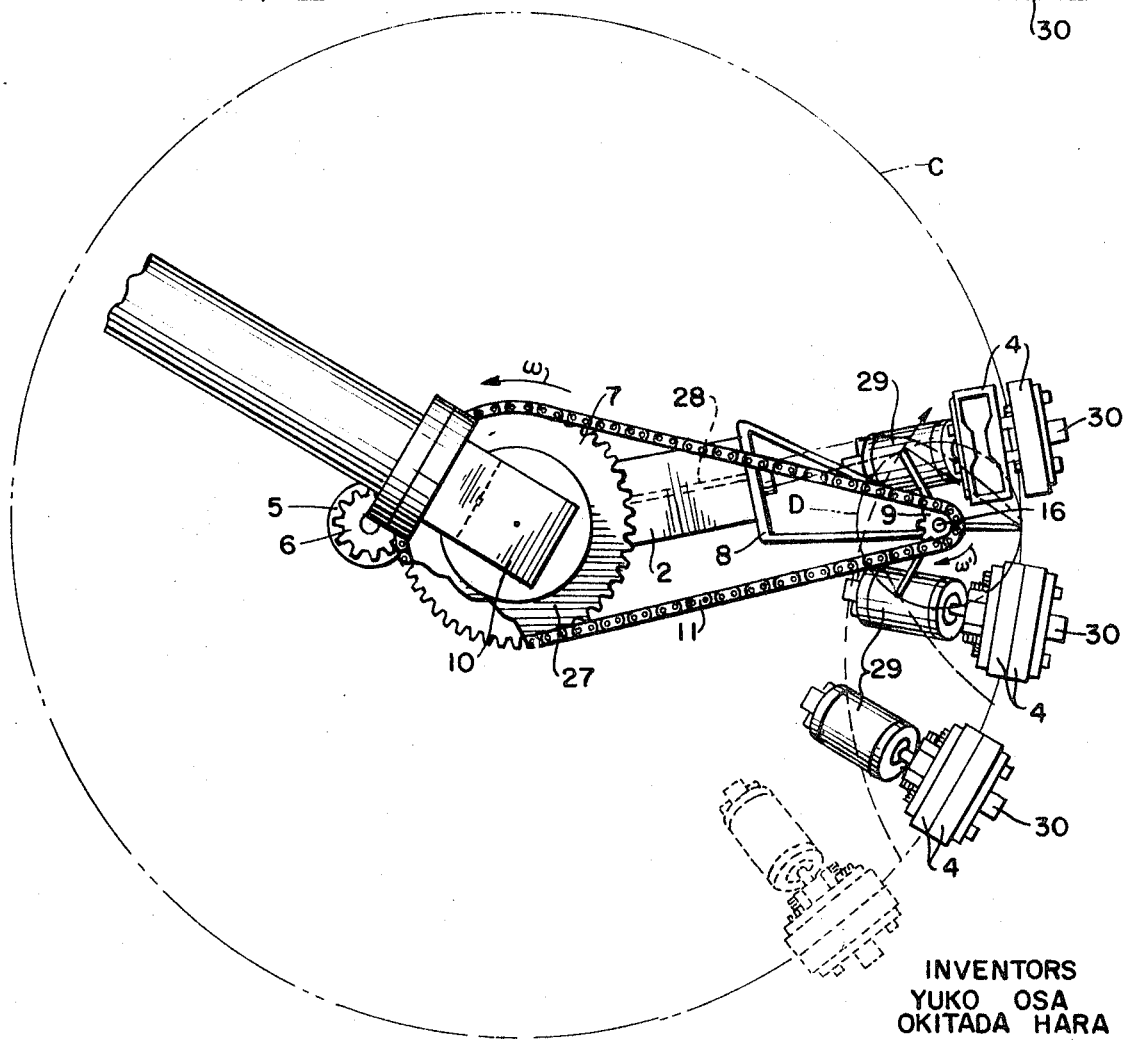
FIG. 2 is a plan view thereof.

Referring particularly FIGS. 1 and 2, the leading end portion 10 of a horizontally positioned extruder or extruding machine extends vertically downwardly, and its lowermost end is coupled through a rotary coupling 1 to a parison die member 2. Thus, the parison die member 2 is rotatable about the axis of the rotary coupling 1. A motor 5 has a toothed wheel 6 coupled to its shaft, and the wheel 6 extends upwardly from the motor with its axis in parallel with the axis of rotation 13 of the parison die member 2. Another toothed wheel 27 is disposed below the rotary coupling 1 so as to mesh with the toothed wheel 6. Above the toothed wheel 27 is disposed a sprocket wheel 7.

A rotary coupling 14 is attached to the lower end of the parison die member 2 and communicates with a central hole 28 formed through the parison die member 2. Power to the motor 5 and other required devices such as heating means are supplied through power supply lines through a slip ring 15 attached around the periphery of the rotary coupling 14.

At the leading end of the horizontal portion of the parison die member 2 is fixedly secured an arm 8 having a shaft 16. The rotary guide 3 having $n$ leg portions 12 which are vertically disposed equiangularly peripherally of the shaft 16 is rotatably carried by the shaft 16. In the illustrated embodiment of the invention $n=3$. As shown in the drawings, it is to be noted that the legs 12 extend substantially parallel to the axis of shaft 16, and intersect the plastic flow axis of the parison die member (shown in dash lines in FIG. 1) in a direction substantially normal thereto.

A sprocket wheel 9 is fixedly secured to the upper end of the shaft 16 at the same level with that of the sprocket wheel 7 and between these two sprocket wheels a chain 11 extends in engagement therewith.

$N$ pairs of split dies 4 for molding hollow articles are disposed with equal spacings along the circumference of a circle C whose center is the axis 13. The split dies are supported in a die-carrying or supporting frame 30 which is disposed stationarily horizontally along the circumference of circle C. For example, each pair of split dies 4 for molding a hollow articles or molding are so disposed as to be actuated by a separate cylinder 29 operated by compressed air through a link mechanism 31 so as to close the dies. The closed position of the split die is shown in solid lines and the open position is shown in dashed lines.

Now the radius of the circle C in a horizontal plane containing the axis of the central hole 28 formed through the parison die member 2 will be designated by $R$; the distance between the axis of rotation of the shaft 16 and the leg portion 12, that is the radius of rotation of the leg portion 12, by $r$; the angular velocity of the parison die member 2 in the direction indicated by the arrow in FIG. 2, by $\omega$; and the relative angular velocity of the leg portion 12 in the rotation about the axis of the guide 3 in the direction indicated by the arrow in FIG. 2 by $\omega'$. It must be noted here that the guide 3 is so disposed that the circular locus of the rotation of its leg portion 12 is inscribed to the circle C. Then the above, described $N$, $n$, $R$, $r$, $\omega$ and $\omega'$ are so selected as to have the following relations: $\omega/\omega' = \alpha r/R = n/N$ (1) where $d$ is a constant representing the degree of slippage, that is a ratio of velocity at the contact point. Thus, $\alpha$ is selected from any arbitrary value, and for example when $\alpha=1$ the circle D (i.e. the locus of the legs 12) is in rolling contact relation with the circle C.

Furthermore, the arrangement of the present invention is such that when one leg portion is interposed between two adjacent pairs of split dies 4, at least one leg portion 12 is aligned with the straight line between the axis 13 and shaft 16.

Since $\alpha$ is constant, the curve traced by the point P in FIG. 4 which indicates the position of one of the legs, 12, is generally trochoid. In the embodiment shown in FIGS. 1 and 2, the point P is on the circle D which in turn is in rolling contact relation with the circle C and is inscribed therein, so that the curve traced by the point P, that is the curve traced by the leg portion 12 of the guide 3 is the closed hypocycloid as shown in FIG. 4.

In the embodiment of the present invention whose construction and arrangement have been described with reference to FIGS. 1 and 2 hereinabove, thermoplastic material is advanced by, for example, a screw through the leading end portion 10 of the extruding machine and is heated by, for example, a suitable electric heater (not shown) and is made to pass through the rotary coupling 1 and the parison die member 2 while maintaining suitable moldability. Thereafter, the parison is extruded in the form of a tube in which is trapped the air introduced through the central hole 28 of the parison die member 2, then is supported by the rotary leg portion 12 and clamped pair of split dies 4 of the preceding stage or the accessories thereof, and directed toward the next pair of split dies 4 which are spaced apart gradually as shown in FIGS. 2 and 5. When the tubular thermoplastic material is charged into the cavity of the pair of split dies 4 by the leg portion 12 which moves along the cycloid as shown in FIG. 4, the thermoplastic material is clamped into the split dies 4 by the cylinder 29 and the link mechanism 31 as described above.

After the thermoplastic material is charged into the split dies and after the dies are clamped, the air is introduced into the hollow portion of the thermoplastic material through a hollow needle or the like, thereby expanding the material. Thereafter, the material is cooled, thus molding a hollow articles of molding of the thermoplastic material. The clamped split dies 4 are opened before a new tubular thermoplastic material is supplied from the rotary guide 3, thereby ejecting the hollow articles out of the split dies 4.

In this case, it must be noted that the inner surface of the tubular thermoplastic material trapping therein the air is prevented from adhering to itself by the trapped air except the portion with which the leg portion 12 engages.

The parison die member 2 and the rotary guide 3 continuously rotate and revolve respectively relative to the nonrotary die-carrying and supporting frame 30 which is not rotated along the circumference of the circle C while hollow articles are molded continuously as described above. Some preferred constructions of the rotary guide 3 are shown in FIGS. 3a to d, but it is to be understood that other variations and modifications can be effected.

Referring to FIGS. 6 and 7 illustrating another embodiment of the present invention, the rotary coupling 1 and the parison die member 2 which are assembled in unison are rotated about a drive shaft 17 disposed coaxially of the coupling 1 through a rotary mechanism 18 provided with the sprocket wheel 7 and another rotary mechanism 20 disposed above the rotary mechanism 18. A rotary frame 19 is disposed for rotary motion at an angular velocity $\omega$ through the drive shaft 17 and the rotary mechanism 18. At the free end of the rotary frame 19 is disposed a vertical shaft 16' carrying a sprocket wheel 9' at the lower end thereof. This sprocket wheel 9' is driven from the sprocket wheel 7' through the chain 11' so that the rotary guide 3 carried by the upper end of the shaft 16' is rotated. To the parison die member 2 is attached a direction control arm 21 which is located in a vertical plane containing the axis E-E' of the parison die member 2. The parison die member 2 and the rotary frame 19 are coupled through a spring 22 in such a manner that one of the leg portions 12 is normally resiliently in contact with the direction control arm 21 when rotated as shown in FIG. 7.

In the embodiment described with respect to FIGS. 6 and 7, the thermoplastic material is extruded through the extruding machine, the rotary coupling and the parison die member 2 as in the case of the embodiment described with reference to FIGS. 1 and 2. The parison die member 2 is rotatably disposed upon the rotary frame 19 through the rotary mechanism 20 and the direction control arm 21 is normally in contact with the leg portion 12 of the rotary guide 3 so that the extrusion direction of the thermoplastic material can be controlled so as to be directed toward the leg portion 12 supporting the material as shown in FIG. 5.

In the embodiment described with reference to FIGS. 6 and 7, the direction control arm 21 and the rotary mechanism 20 may be eliminated. In this case, the central axis E-E' of the parison die member can be controlled substantially at a constant angle relative to the rotary frame 19. Furthermore, it is not necessarily required that the axis of the rotary coupling 1 be coaxial with the axis of rotation of the rotary frame 19 and/or with the drive shaft 17.

Referring to FIGS. 8 to 10 illustrating a further embodiment of the present invention, the axes of rotation of a rotary tubular guide arm 23, the rotary mechanism 18 and the drive shaft 17 are all coaxial with a common vertical axis. Arms 8 are attached to the lower end portion of the parison die member 2, and the rotary guide 3 is carried by a horizontal or lateral shaft extending between the arms 8 at the lower ends thereof. It will be seen that in this embodiment, the structure from the parison die member 2 to the leg portion 12 of the guide 3 is a vertical arrangement, as opposed to the horizontal arrangement shown in FIG. 1. Below the rotary tubular guide arm 23 is rotatably disposed a power transmission shaft 25 having at one end thereof a bevel gear 34 is mesh with a fixed bevel gear 24. The shaft 25 has a sprocket wheel 26 fixed at the other end thereof and adapted to drive a sprocket wheel 9'' carried at one end of the shaft 16'' through a chain 11'', thereby transmitting the power from the drive shaft 17 to the rotary guide 3, that is leg portions 12 thereof.

Each pair of split dies carried by the die-carrying or supporting frame 30 is adapted to be opened or closed by the pneumatically operated cylinder 29 and the link mechanism 31 and the coaction between the leg portions 12 and the split dies 4 is controlled as described in the first embodiment shown in FIGS. 1 and 2. This will be clear from FIG. 10.

In the embodiment of the present invention described with reference to FIGS. 8—10, the thermoplastic material extruded through the leading end 10 of the extruding machine is forced through the rotary coupling 1, the rotary tubular guide arm 23 and the parison die member 2, thus providing hollow tubular shape. Thereafter, the material is directed substantially vertically along the line E-E' and the material is supported by the leg portion 12. When the leg portion 12 is moved to the position indicated in FIGS. 8, 9 and 10, the material is charged into a pair of split dies 4 and then the die are clamped. During this operation, the leg portion 12 serves to prevent the material from dropping too fast.

The leg portions 12 are moved along the circumference of the circle C so that the curve traced by a point upon one leg portion 12 is the curve substantially similar to the cycloid upon the surface of a cylinder whose bottom is coincident with the circle C. (This curve will become the cycloid when developed). On the other hand, the rotary tubular guide arm 23 rotates about the drive shaft 17.

It is to be understood that instead of the guide drive mechanism of the type described above, other suitable devices such as gear trains, motors and so on may be employed so as to provide suitable synchronization in the rotation of the guide 3.

As described hereinabove, a device for continuously molding hollow articles from thermoplastic material is such that a number of N pairs of split dies are disposed upon a plane in equiangularly spaced-apart relation along the circumference of a circle; a parison die member is disposed so as to rotate about the axis of a die-carrying or supporting frame which carries said N pairs of split dies arranged and disposed as described above; blower means is provided in communication with a central hole formed through the parison die member; a rotary guide having a number of n is rotatably disposed upon the parison die member or a rotary frame; the leg of the guide is so arranged as to rotate relative to the split dies by maintaining the relation of: $\omega/\omega' = n/N$ where $\omega$ = angular velocity of rotation of the parison die member or the rotary frame about the center of the die-carrying or supporting frame; and $\omega'$ = angular velocity of a leg of the rotary guide relative to the parison die member or the rotary frame;

whereby the thermoplastic material extruded from the parison die member is supported by the leg of the rotary guide while being charged into a pair of split dies, the split dies as a whole not being rotated. Therefore, the following advantages are occurred from the present invention:

I. Less vibrations and noise;
II. Arbitrary selection of space for attachment of split dies thus facilitating maintenance and inspection;
III. No problem of abrasion and wear of split dies due to their rotation; and
IV. Feasibility of increasing the dimensions of split dies and increasing remarkably the number of articles produced per hour.

What we claim is:

1. A device for continuously molding hollow articles from a thermoplastic material comprising a parison die member mounted for rotation about a first axis, said parison die member having a plastic flow axis, $N$ die assemblies each having a pair of split dies said assemblies being aligned with said parison die member and fixedly mounted with equal spacing about the circumference of a circle having an axis common with said axis of rotation of said parison die member, said die assemblies being positioned to sequentially receive tubular thermoplastic material from said parison die member, a rotary guide having $n$ legs mounted for rotation about said first axis with said parison die member, said legs being mounted for rotation about a second axis for guiding said tubular thermoplastic material from said parison die member to said die assemblies, said legs extending substantially parallel to said second axis and normal to said plastic flow axis, and means for continuously rotating said parison die member and legs according to the relation:

$$\omega/\omega' = n/N$$

wherein $\omega$ is the angular velocity of said parison die member about said first mentioned axis and $\omega'$ is the angular velocity of said legs with respect to said parison die member, whereby said tubular thermoplastic material is sequentially supported by said legs while being charged into said die assemblies.

2. In a device for continuously molding hollow articles from a thermoplastic material of the type including a parison die member rotatable about a first axis and a plurality of die assemblies equally distributed about the circumference of a circle having an axis common with said first axis and aligned with said parison die member, said parison die member having a plastic flow axis, and wherein said die assemblies each include a pair of split dies, the improvement comprising a rotary guide having $n$ legs, means for continuously rotating said parison die member and guide about said first axis with an angular velocity $\omega$, and means for continuously rotating said legs about a second axis with an angular velocity $\omega'$ with respect to said parison die member, said legs being substantially parallel to said second axis and normal to said plastic flow axis, whereby $$\omega/\omega' = n/N$$

$N$ being the number of die assemblies, said legs being positioned to sequentially support tubular thermoplastic material from said parison die member and guide it into said die assemblies.

3. The device of claim 2 further comprising blower means, and means connecting said blower means to said parison die member.